US012578901B2

(12) United States Patent
Jahren et al.

(10) Patent No.: US 12,578,901 B2
(45) Date of Patent: Mar. 17, 2026

(54) CLOCK DOMAIN CROSSING

(71) Applicant: Arm Limited, Cambridge (GB)

(72) Inventors: Ole Henrik Jahren, Trondheim (NO);
Magnus Walstad, Trondheim (NO);
Kjetil Volden, Buvika (NO)

(73) Assignee: Arm Limited, Cambridge (GB)

( * ) Notice: Subject to any disclaimer, the term of this
patent is extended or adjusted under 35
U.S.C. 154(b) by 3 days.

(21) Appl. No.: 18/592,671

(22) Filed: Mar. 1, 2024

(65) Prior Publication Data

US 2025/0278213 A1     Sep. 4, 2025

(51) Int. Cl.
G06F 3/06          (2006.01)

(52) U.S. Cl.
CPC ............ G06F 3/0656 (2013.01); G06F 3/061
(2013.01); G06F 3/067 (2013.01)

(58) Field of Classification Search
None
See application file for complete search history.

(56) References Cited

U.S. PATENT DOCUMENTS 7,913,124 B2 * 3/2011 Udell .................. G06F 11/0751
714/49

10,742,216 B1 * 8/2020 Chhodavdia ....... H03K 19/0175
2021/0312962 A1 * 10/2021 Singhal ................ G11C 7/1084

OTHER PUBLICATIONS

Robert Bedichek, "Some Efficient Architecture Simulation Techniques", Proceedings of the Winter 1990 USENIX Conference, Jan. 22-26, 1990, 12 pages.

* cited by examiner

*Primary Examiner* — Farley Abad
*Assistant Examiner* — Dayton Lewis-Taylor
(74) *Attorney, Agent, or Firm* — NIXON & VANDERHYE P.C.

(57)          ABSTRACT

An apparatus comprises buffer circuitry having a plurality of data entries each arranged to store a data block, where each data block has an associated data channel. The buffer circuitry is configured to receive data blocks from producer circuitry controlled by a first clock signal and to provide the data blocks to consumer circuitry controlled by a second clock signal. The apparatus also provides indicator storage having a plurality of indicator entries, wherein each data entry has an associated indicator entry and, for a given data entry storing a given data block, the associated indicator entry is configured to indicate the associated data channel for the given data block. Selection circuitry is provided to select a data entry from which to provide a data block to the consumer circuitry, by referencing the plurality of indicator entries.

20 Claims, 7 Drawing Sheets

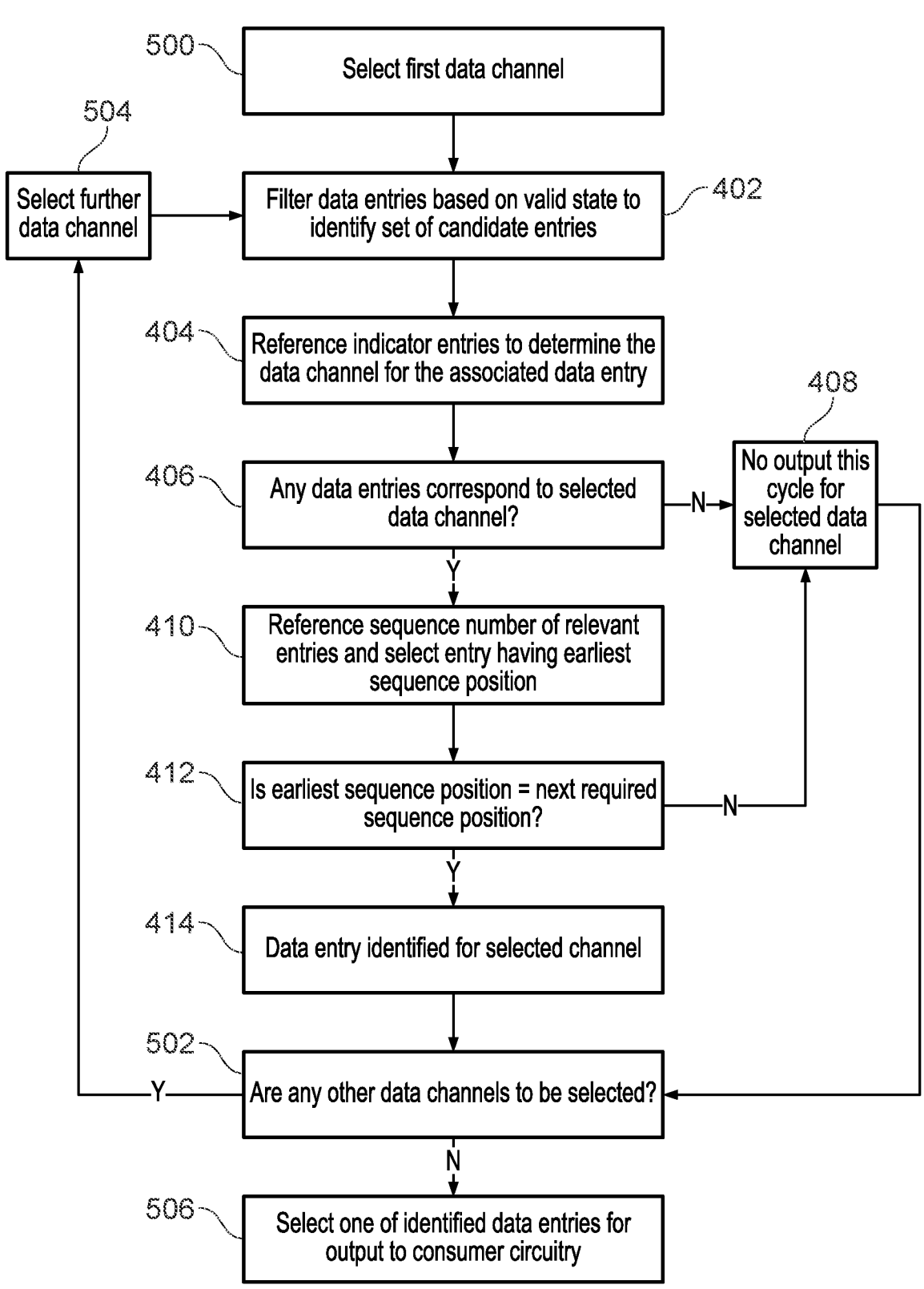

500 — Select first data channel

504 — Select further data channel

402 — Filter data entries based on valid state to identify set of candidate entries 404 — Reference indicator entries to determine the data channel for the associated data entry 406 — Any data entries correspond to selected data channel?

408 — No output this cycle for selected data channel

410 — Reference sequence number of relevant entries and select entry having earliest sequence position 412 — Is earliest sequence position = next required sequence position?

414 — Data entry identified for selected channel

502 — Are any other data channels to be selected?

506 — Select one of identified data entries for output to consumer circuitry

FIG. 5

CLOCK DOMAIN CROSSING

BACKGROUND

Technical Field

The present technique relates to the field of data processing. In particular, the present technique relates to the transmission of data between clock domains.

Technical Background

As the physical size of data processors (such as a central processing unit (CPU) or a graphics processing unit (GPU)) increases, so too does the power and area overhead associated with physical wires and buffers for transmitting data within the processor. It would be desirable to reduce the overhead associated with transmitting data within processors to reduce the overhead incurred by increasing processor size. However, data processors may comprise two or more clock domains, where a clock domain is a group of elements controlled by the same clock signal. Transmitting data across a clock domain boundary may require techniques which complicate the aim of reducing the overhead of transmitting data within processors. It would be desirable to provide a system in which the overhead associated with transmitting data is reduced, and which maintains those advantages whilst permitting data to be transmitted between clock domains.

SUMMARY

At least some examples of the present technique provide an apparatus, comprising:

buffer circuitry comprising a plurality of data entries, wherein each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;

indicator storage comprising a plurality of indicator entries, wherein each data entry has an associated indicator entry and, for a given data entry storing a given data block, the associated indicator entry is configured to indicate the associated data channel for the given data block; and selection circuitry configured, responsive to a selection event, to select a data entry from which to provide a data block to the consumer circuitry, wherein the selection circuitry is configured to reference the plurality of indicator entries to determine the associated data channel for each of a number of candidate data entries for selection.

At least some examples of the present technique provide computer-readable code for fabrication of an apparatus, comprising:

buffer circuitry comprising a plurality of data entries, wherein each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;

indicator storage comprising a plurality of indicator entries, wherein each data entry has an associated indicator entry and, for a given data entry storing a given data block, the associated indicator entry is configured to indicate the associated data channel for the given data block; and selection circuitry configured, responsive to a selection event, to select a data entry from which to provide a data block to the consumer circuitry, wherein the selection circuitry is configured to reference the plurality of indicator entries to determine the associated data channel for each of a number of candidate data entries for selection.

The computer-readable code may be stored on a computer-readable storage medium. The storage medium may be non-transitory.

At least some examples of the present technique provide a method, comprising:

storing a given data block in a given entry of buffer circuitry, wherein the buffer circuitry comprises a plurality of data entries, each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;

providing indicator storage comprising a plurality of indicator entries, wherein each data entry has an associated indicator entry and, for the given data entry storing the given data block, indicating the associated data channel for the given data block with the associated indicator entry; and in response to a selection event, selecting, with selection circuitry, a data entry from which to provide a data block to the consumer circuitry, wherein the selection circuitry is configured to reference the plurality of indicator entries to determine the associated data channel for each of a number of candidate data entries for selection.

Further aspects, features and advantages of the present technique will be apparent from the following description of examples, which is to be read in conjunction with the accompanying drawings.

BRIEF DESCRIPTION OF THE DRAWINGS

FIGS. 4 and 5 are flow diagrams illustrating methods of selecting a data entry for providing a data block to a consumer device;

DESCRIPTION OF EXAMPLES

Figure 1:
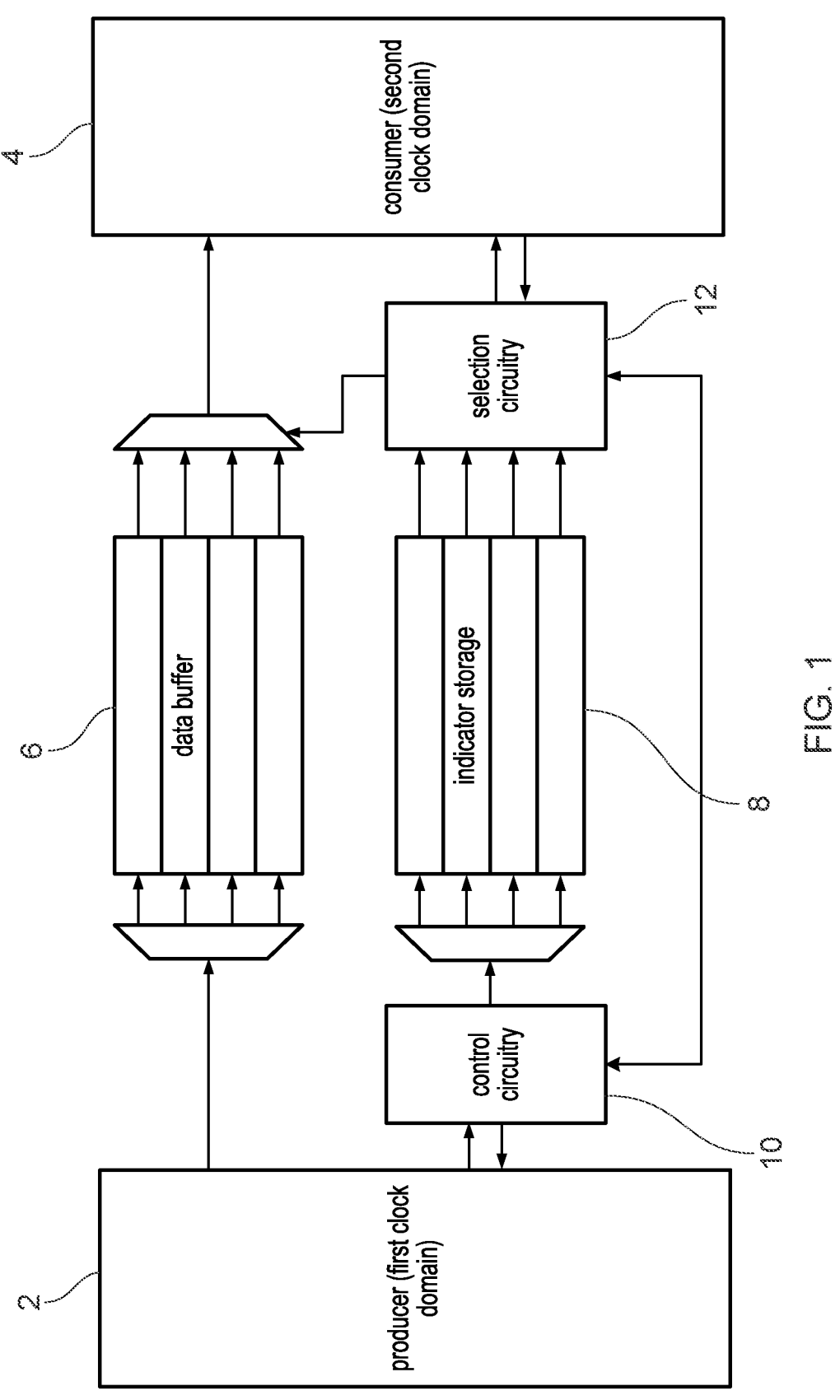
FIG. 1 schematically illustrates an apparatus for transmitting data across a clock boundary.

One technique for reducing the overhead associated with transmitting data in a processor is to share physical wires and buffers between two or more channels which would otherwise have used separate physical circuitry for the transmission of data. For example, different so-called virtual channels may have use of the same physical circuitry at different times. Data from different virtual channels may be buffered on each side of the shared wires to allow each virtual channel to make forward progress independent from the other virtual channels. By sharing physical circuitry between two or more virtual channels, the amount of wires and buffers in the processor can be reduced as each virtual channel does not need to be provided with its own physical channel.

Data may be transmitted across a clock boundary using a buffer with (at least) two ports, one port allowing data to be written in by data producer circuitry in a first clock domain, and one port allowing data to be read by data consumer circuitry in a second clock domain. A buffer allows the clocks on each side of the clock boundary to be independent from each other, and therefore enables transmission of data across an asynchronous clock domain crossing. A first-in-first-out (FIFO) buffer may for example be used to buffer data at a clock boundary, and control state may be communicated between the two clock domains to indicate which entries of the buffer contain valid data.

The inventors have recognised that there are issues associated with using virtual channels in combination with a buffer-based technique to cross clock boundaries. In particular, when physical circuitry is shared between two or more virtual channels, then a buffer at a clock boundary could store data blocks from more than one virtual channel, such that it may be difficult to determine which entry stores data corresponding to which channel. Different virtual channels may read and write data to a buffer at different rates such that relying on the order of entries within the buffer may be insufficient to determine which entry corresponds to which virtual channel. This problem could be overcome by providing independent asynchronous buffers for each virtual channel, such that a single physical channel branches into several buffers at the clock boundary (one per virtual channel) and then back into one physical channel at the other side of the clock boundary. This would mean that each buffer stores data associated with a single virtual channel, such that it is possible to identify which data channel is associated with each data block. However, providing a separate buffer for each virtual channel means that area and power overhead would be high at clock boundaries, and at clock boundaries would eliminate the advantage of using virtual channels.

The inventors have realised that it would be advantageous to provide a buffer for crossing a clock boundary which may handle data from more than one virtual channel. The inventors have realised that such a buffer may also find utility in enabling several distinct physical channels to cross a clock boundary using a shared buffer, thereby also reducing the overhead associated with crossing a clock boundary for systems not using virtual channels. Hence, the inventors have proposed the present technique to enable multiple data channels to cross clock boundaries without requiring separate buffers.

An apparatus according to the present technique comprises buffer circuitry comprising a plurality of data entries, wherein each data entry is arranged to store a data block. A data block may be any unit of data transmitted within the apparatus and which may correspond to the size of a buffer slot. Each data block has an associated data channel from amongst a plurality of data channels. For example, each data block may correspond to one of a plurality of virtual channels, or may correspond to one of several physical channels.

The buffer circuitry is configured to receive data blocks from producer circuitry controlled by a first clock signal and to provide the data blocks to consumer circuitry controlled by a second clock signal, where the first and second clock signals may be independent from each other. For example, the first and second clock signals may have different clock frequencies, and may have an arbitrary phase difference.

The apparatus also comprises indicator storage comprising a plurality of indicator entries, where each data entry of the buffer circuitry has an associated indicator entry of the indicator storage. For example, in some examples there could be a one-to-one correspondence between entries in the buffer circuitry and the indicator storage (although it will be appreciated that this is not required, as long as each data entry has a corresponding indicator entry). For a given data entry storing a given data block, the associated indicator entry is configured to indicate the associated data channel for the given data block.

The apparatus comprises selection circuitry configured to be responsive to a selection event to select a data entry from which to provide a data block to the consumer circuitry. The selection event could be an explicit event such as a selection signal, or any other event. In one example, a selection event may be triggered on each cycle of the second clock signal. The selection circuitry is configured to reference the plurality of indicator entries to determine the associated data channel for each of a number of candidate data entries for selection. The candidate data entries could include, for example, all valid data entries of the buffer circuitry, or a particular subset of data entries being considered for a particular selection event.

Due to the provision of indicator storage, the selection circuitry is able to determine which entries correspond to each data channel, therefore allowing the buffer circuitry to store data corresponding to multiple data channels in a single buffer at the clock boundary.

Some examples comprise allocation circuitry responsive to a received data block from the producer circuitry to choose a free data entry available for storage of data blocks having the associated data channel for the received data block, to store the received data block in the chosen data entry, and to populate the indicator entry associated with the chosen data entry. Hence, a data entry and its associated indicator entry may be updated together such that each valid data entry has a valid associated indicator entry.

The plurality of data entries may comprise shared data entries available for storage of data blocks whose associated data channel is any one of two or more data channels. A particular shared data entry may be available for storage of data blocks belonging to any data channel, or may be available for storing data blocks belonging to one of the data channels in a proper subset of the available data channels. Hence, a given data entry may at different times be used for storing data belonging to different data channels such that, in the absence of an associated indicator entry, selection circuitry may be unable to determine the data channel to which data stored in that shared entry belongs. Therefore, providing indicator storage enables the selection circuitry to select data belonging to a particular desired data channel from the buffer circuitry.

In addition to the plurality of data entries having associated indicator entries, the buffer circuitry may comprise at least one dedicated data entry available for storage of data blocks for a given data channel, and not available for storage of data blocks for other data channels. For example, a dedicated data entry may only be available for the storage of data blocks of a single data channel. A dedicated data entry may not be provided with an associated indicator entry if the dedicated data entry can only be used to store data from one data channel, but in some examples the dedicated data entry may have an associated indicator entry for indicating a sequence position (discussed below), or to allow a selection to be made with selection circuitry may have an associated indicator entry having a fixed indication of the associated data channel, for example.

Certain data channels may comprise data blocks which can be transmitted out of order. For example, the data blocks may comprise ordering information, allowing the data blocks to be transferred in any order and rearranged into a correct order by receiving circuitry on the consumer side. However, other data channels may be ordered data channels in which data blocks should be received in the order they were originally transmitted.

To maintain ordering, the buffer may operate on a first-in-first-out basis such that at any given point the next data to be read from the buffer is the oldest valid data stored in the buffer. However, the inventors have realised that when data from a number of data channels is stored in the same buffer circuitry, then arranging the buffer as a first-in-first-out structure risks certain data channels delaying transmission of data in other data channels. For example, if a data entry stores a data block belonging to a data channel which is stuck (e.g., the consumer circuitry is not ready to receive data belonging to that data channel) then all subsequently transmitted data may be delayed until that data block can be read.

Therefore, in some examples, for a given data entry storing a given data block, the associated indicator entry is configured to indicate a sequence position of the given data block within the associated data channel. The selection circuitry may therefore be configured to select a data entry from which to provide a data block to the consumer circuitry on the basis of the sequence positions indicated for a set of candidate data entries for selection. For example, the data block corresponding to the earliest sequence position may be selected to be provided to the consumer circuitry.

Providing an indication of the sequence position for each given data block allows data entries to be read from the buffer circuitry in an order other than the order in which they were stored to the buffer circuitry, because the correct ordering can be determined by referencing the sequence position indications. Therefore, the buffer circuitry does not need to adopt a first-in-first-out structure. This enables the buffer circuitry to be used for multiple data channels without any particular data channel impacting whether or not data belonging to a different channel can be read.

In some examples, data blocks may not appear on the consumer side in order since different entries may have different delays when crossing between the two clock domains. The selection circuitry may be on the consumer side of the buffer circuitry, meaning that at a certain time the data block having the earliest sequential position as observed by the selection circuitry may not be the next data block in the sequence for a particular data channel. Hence, in some examples, the selection circuitry may also be configured to check whether the data block corresponding to the earliest sequence position in the buffer circuitry is a next data block for a given data channel (i.e., does it have a sequence position immediately following the data block most recently provided to the consumer circuitry for the particular data channel). The selection circuitry may store an indication of the sequence position of the data block most recently provided to the consumer circuitry for each data channel to be used for such a comparison. Providing an indication of a sequence position can therefore also enable channel ordering to be maintained in a system where different data entries are associated with different delays between two clock domains.

Some examples may comprise sequence counting circuitry configured to maintain, for each of the plurality of data channels, an indication of a sequence position of a latest data block received from the producer circuitry for that data channel, for reference by allocation circuitry when populating the associated indicator entry for the given data entry. For example the allocation circuitry may use the indication provided by the sequence counting circuitry to populate the associated indicator entry with a sequence position indication when storing a data block to a given data entry.

The sequence indication may be a counter which increments each time data is received for a corresponding data channel. In general, the sequence indication may indicate a current sequence position using any sequence long enough that each data block stored at a given time for a particular data channel has a unique sequence position indication. For example, a repeating counter could be used as long as the maximum value of the counter is at least as large as the number of data entries which may be populated at any given point with data blocks from a given data channel. In some examples, a linear feedback shift register could be used as sequence counting circuitry. It will be appreciated that a decrementing counter could be used in the same way as an incrementing counter.

The number of data entries in the buffer circuitry may not be particularly limited, and the techniques described herein could be applied to a data buffer having a wide range of data entries. However, in some examples the number of data entries provided by the buffer circuitry may be equal to or greater than a number of data channels from which data can be received. This can enable at least one data entry of the buffer circuitry to be available for each data channel, meaning that each data channel is able to independently maintain forward progress. For example, an allocation policy may be enforced by the allocation circuitry which ensures that at least one data entry is available for each data channel at any given time. This means that any one data channel may be unable to occupy all slots of the buffer circuitry and therefore be unable to prevent data blocks associated with the other data channels from being transmitted across the clock boundary.

In some examples, the apparatus may comprise capacity indication circuitry to provide capacity information to the producer circuitry. In some examples, for each data channel the capacity information indicates a remaining number of data entries available for storage of data blocks for that data channel. The producer circuitry may not attempt to provide data to the buffer circuitry for a particular data channel if the capacity information indicates that there are no data entries available for storing data blocks associated with the particular data channel.

The remaining number of data entries may be calculated based on a total number of data entries available for storage of data blocks for that data channel minus a number of data entries currently occupied by data blocks for that channel. For example, the capacity indication may include a number of credits available for each data channel, where each credit corresponds to an available data entry. For each data channel, the total number of data entries initially available to a data channel may be at least one, to ensure that each data channel can maintain independent forward progress independently of the other data channels, because at any one time at least one of the data entries of the buffer circuitry can be occupied with data from each data channel.

The number of total credits for a given data channel may be formed from a combination of dedicated credits and shared credits. For example, a buffer may have M virtual channels, each virtual channel having D dedicated credits. The buffer may also have S shared credits. The buffer may therefore have a total number of entries $T=(M*D)+S$. Dedicated credits may only form part of the total number of credits for a corresponding data channel, whilst shared credits may form part of the total number of credits for any data channel. For example, with $M=2$, $D=1$, $S=7$ this results in 9 credits in total (and 9 data entries). Initially there are $D+S=7+1=8$ credits available for each data channel, with the number of remaining credits decreasing as entries are occupied and increasing as entries are made free again. At least one credit is available for each data channel, regardless of the number of entries occupied by data blocks associated with another channel, because each channel has at least one dedicated credit. It is noted that whilst each data channel may have at least one dedicated credit, this does not mean that there is a dedicated data entry for that channel. The credit refers to the number of data entries available for a given data channel, but does not affect which data entry is used to store the data for that channel.

In some examples, the buffer circuitry may comprise at least N data entries, wherein N is a minimum number of data entries required to maintain full throughput of data blocks communicated from the producer circuitry to the consumer circuitry in a worst case timing scenario having regard to a relation between the first clock signal and the second clock signal. Full throughput may be achieved when a data block is transferred over the clock boundary for each clock cycle of the slowest clock (of the first and second clocks), meaning that the rate of transmission is not limited by the buffer.

For example, several steps may be required to transfer data from the producer circuitry to the consumer circuitry via a particular data entry. As discussed below, valid state may need to be transmitted to the receiver side of the clock boundary indicating that the given entry contains data, the data block may then be read from the data entry by the consumer side, valid state may be returned to the transmitter side of the clock boundary indicating that the data was successfully read, and the data entry may need to be cleared ready for the next data block. The number of cycles taken to perform these steps may depend on a relationship between the first and second clock. For example, if the clocks are at different speeds then certain steps (e.g., reading the data and updating valid state) performed by the side with the higher clock frequency would appear to be completed quicker from the perspective of the slower clock, and therefore the overall process may take fewer steps from the perspective of the slower clock. Even if both clocks are at the same frequency, their relationship affects the number of cycles required to perform the steps. For example, transmitting valid state between the two clock domains can take a number of cycles which depends on the phase offset between the first and second clocks (due to the requirement for synchronization), as will be discussed in greater detail below.

In any case, if it takes N cycles of the slowest clock to complete all of the steps required to use a given entry to transmit a data block, then the buffer circuitry may require N entries for full throughput if each of the steps are fully pipelined. With N entries, one of the entries can be ready for transmitting data in every clock cycle, and hence providing N data entries in the buffer circuitry means that the buffer allows full throughput to be maintained. The above assumes one message per cycle, although if the apparatus is configured to transmit X messages per cycle, then it will be appreciated that for the same reasons, a minimum number of data entries equal to $X*N$ may be provided.

It has been discussed above how each channel may have at least one dedicated credit, such that the buffer comprises $T=(M*D)+S$ data entries. When providing a minimum of N entries, for full throughput to be achieved for a given channel then it may be required that any given channel can have access to a full N entries. A given channel may be able to use $D+S$ credits, meaning that it has access to up to $D+S$ data entries. Therefore, $D+S$ may be equal to or greater than N for each channel to have access to sufficient data entries to enable full throughput for a given channel. To ensure that this is the case, then S may be selected such that at a minimum $S=N-D$. Therefore, in some examples, to enable each channel to achieve full throughput and enable each data channel to make independent forward progress, the buffer circuitry may comprise at least $T=(M*D)+N-D$ data entries (where M is the number of data channels, D is the minimum number of entries available to each channel, and N is the minimum number of entries required to maintain full throughput). If, for comparison, a separate data buffer were provided for each data channel, and each buffer enabled full throughput, then each buffer would require N entries for a total of $M*N$ entries. Hence, it can be seen that providing a shared buffer, even when each channel is provided D dedicated entries, can reduce the total number of entries provided (assuming that $D<N$).

In some examples, the selection circuitry may be configured to select a particular data channel, and then determine (by reference to the indicator entries) in response to a given selection event which of the candidate data entries store data blocks associated with that particular data channel. Therefore, if data from a particular data channel is desired at a particular selection event then the selection circuitry can identify whether any data is available in the buffer for that data channel.

In other examples, the selection circuitry may be configured to determine in parallel, for multiple data channels of the plurality of data channels, which of the candidate data entries store data blocks associated with that data channel. The multiple channels may include all of the data channels, for example, or a subset of the data channels. For example, parallel determination by the selection circuitry may be carried out when the consumer circuitry may wish to receive a data block from any data channel. This can reduce the likelihood of a cycle where no data is transferred. In other examples, for timing reasons it may be beneficial to determine which entries belong to which of a plurality of channels before selecting a particular data channel for transmission.

In some examples, in response to determining that the candidate data entries comprise data blocks associated with more than one data channel, the selection circuitry is configured to apply a selection criterion to select one of the data channels for providing the data block to the consumer circuitry. The selection criterion could be based on a particular data channel provided to the selection circuitry, for example. In other examples the selection criterion may apply a selection criterion based on a transmission history, for example such that data blocks are transmitted roughly equally from each data channel, or based on other selection policies which may favour a particular distribution of bandwidth between the data channels.

The set of candidate entries from which a data entry can be selected may include only the valid entries in the buffer circuitry. Therefore, the selection circuitry may have access to an indication of which buffer entries are valid. In some examples, the apparatus may comprise valid state circuitry configured to maintain valid state for a corresponding data entry, the valid state indicating whether the corresponding data entry stores a data block that is available to be read by the consumer circuitry. The selection circuitry may be configured to reference the valid state circuitry when selecting a data entry. A valid state indication may be provided for each entry, and in one example could be a single bit per entry indicating either a valid or invalid state. However, as discussed below, in some examples the valid state may comprise two bits per entry to enable both circuitry controlled by the first clock signal (producer-side circuitry) and circuitry controlled by the second clock signal (consumer-side circuitry) to update the valid state.

In some examples, the selection circuitry may reference valid state circuitry in advance of referencing the plurality of indicator entries when selecting a data entry. This can provide glitch filtering which reduces the chance of an incorrect selection resulting due to valid state changing during a selection process, which would otherwise be a risk as the valid state may update asynchronously.

As well as being used to select a valid entry for providing to the consumer circuitry, valid state may also be used by allocation circuitry to determine whether a data entry is available for storing data without overwriting currently valid data. Therefore the valid state may also be accessible to allocation circuitry. For example, the valid state circuitry may maintain two copies of the valid state, one per clock domain, to allow both the allocation and selection circuitry to access the valid state.

The apparatus may comprise producer-side update circuitry to update the valid state indication for a given data entry in response to determining that the allocation circuitry has stored a data block to the given data entry. For example, in response to storing a data block in a data entry, the indication for that entry may be updated to indicate that the entry stores a valid data block.

Similarly, the apparatus may comprise consumer-side update circuitry configured to update the valid state for a given data entry in response to determining that the selection circuitry has selected the given data entry for providing a data block to the consumer circuitry. The valid state indication may, for example, be updated to indicate that the data entry has been read and is therefore now available to be overwritten.

Examples will now be described with reference to the figures.

FIG. 1 schematically illustrates an apparatus for transmitting data across a clock boundary. Data is received from producer circuitry 2 in a first clock domain, where the producer circuitry is controlled by a first clock signal, and is provided to consumer circuitry 4 in a second clock domain, where the consumer circuitry is controlled by a second clock signal. The first and second clock signals may have frequencies and phases which are independent from each other. The producer and consumer circuitry may, for example, be different regions within a processor such as a CPU or a GPU.

As the first and second clocks are independent from each other, then it is not possible to directly transmit a signal from the producer to the consumer, as this signal could lead to metastability in the consumer circuitry due to the possibility of sampling the signal whilst the signal is changing state. In one technique a synchronizer (e.g., a dual flip-flop synchronizer) could be used at the clock domain to reduce the likelihood of propagating a metastable signal in the consumer circuitry. However, bandwidth can be greatly increased by using a buffer at the clock domain crossing. In one technique, a first-in-first-out (FIFO) buffer could be used to temporarily store data being transferred from the producer circuitry to the consumer circuitry. Data could be stored to the FIFO by the producer at the first clock frequency and read from the FIFO by the consumer at the second clock frequency.

However, the inventors have realised that this technique has drawbacks if the data to be transferred over the clock domain crossing belongs to several data channels. Data from several channels may be present if shared circuitry is used to transmit data within the processor such that several virtual channels share the same physical channel, to reduce the amount of circuitry (wires, buffers) compared to examples where every channel is provided with dedicated circuitry. Data from several data channels may also be present if several physical channels feed into the same buffer at the clock boundary. Techniques in which different virtual channels share the same transmission circuitry may be particularly common in processors having larger physical sizes, where the overhead of data transmission grows as the physical size of the processor increases. For example, modern graphics processing units (GPUs) may particularly benefit from use of virtual channels.

There may be several drawbacks with a single FIFO being used for multiple data channels. For example, the consumer 4 may receive data from different channels at different rates, and if there is data belonging to one data channel at the oldest position in the FIFO, then this data can block data from other channels from being read. In addition, the consumer circuitry may observe an ordering of data within the FIFO which varies from the order on the provider side, and if ordering were the only way to associate data blocks with data channels, then this may make it difficult to maintain an association between data blocks and data channels over the clock boundary.

According to examples of the present technique, a data buffer 6 is provided to store data being transferred from the producer circuitry 2 to the consumer circuitry 4. The data buffer comprises a plurality of data entries configured to store data blocks. A single physical channel may transfer data belonging to two or more virtual channels into the data buffer. Alternatively, or in addition, two or more physical channels may transfer data belonging to different data channels into the data buffer. In either case, a given entry of the data buffer may store a data block from one of two or more data channels. In some examples each data entry may store data from any data channel, although in other examples each data entry may only store data from a subset of data channels.

Indicator storage 8 is also provided, comprising a plurality of indicator entries. Data entries of the data buffer 6 have an associated indicator entry, although there may be certain dedicated data entries of the data buffer 6 which, as a result of only being able to store data from a single data channel, do not have an associated indicator entry. Association between data buffer entries and indicator entries may be one-to-one, but in some examples a single indicator entry may correspond to a plurality of data entries.

The indicator entry associated with a given data entry provides an indication of the data channel with which the data block stored in the given data entry is associated. The indicator entry may also indicate a sequence position of the data block within the associated data channel. This means that consumer side selection circuitry 12 is able to determine which data channel is associated with each data block stored in the data buffer without relying on an order of entries within the buffer. This therefore provides much greater freedom when allocating entries into the data buffer, prevents certain data channels from being blocked by other slower data channels, and importantly maintains an association between data blocks and data channels over the clock boundary.

Control circuitry 10 may be responsible for setting the associated indicator entry when a data block is stored to a given data entry. The control circuitry may determine which data channel the data block belongs to and indicate that data channel in the indicator entry associated with the given data entry.

A connection is shown between the control circuitry 10 and the selection circuitry 12. This connection may be used to transfer information indicating the validity of each data entry. As the amount of validity information may be small (compared to the volume of data being transferred) then a synchronizer-based technique may be suitable for transferring the validity state.

Figure 2:
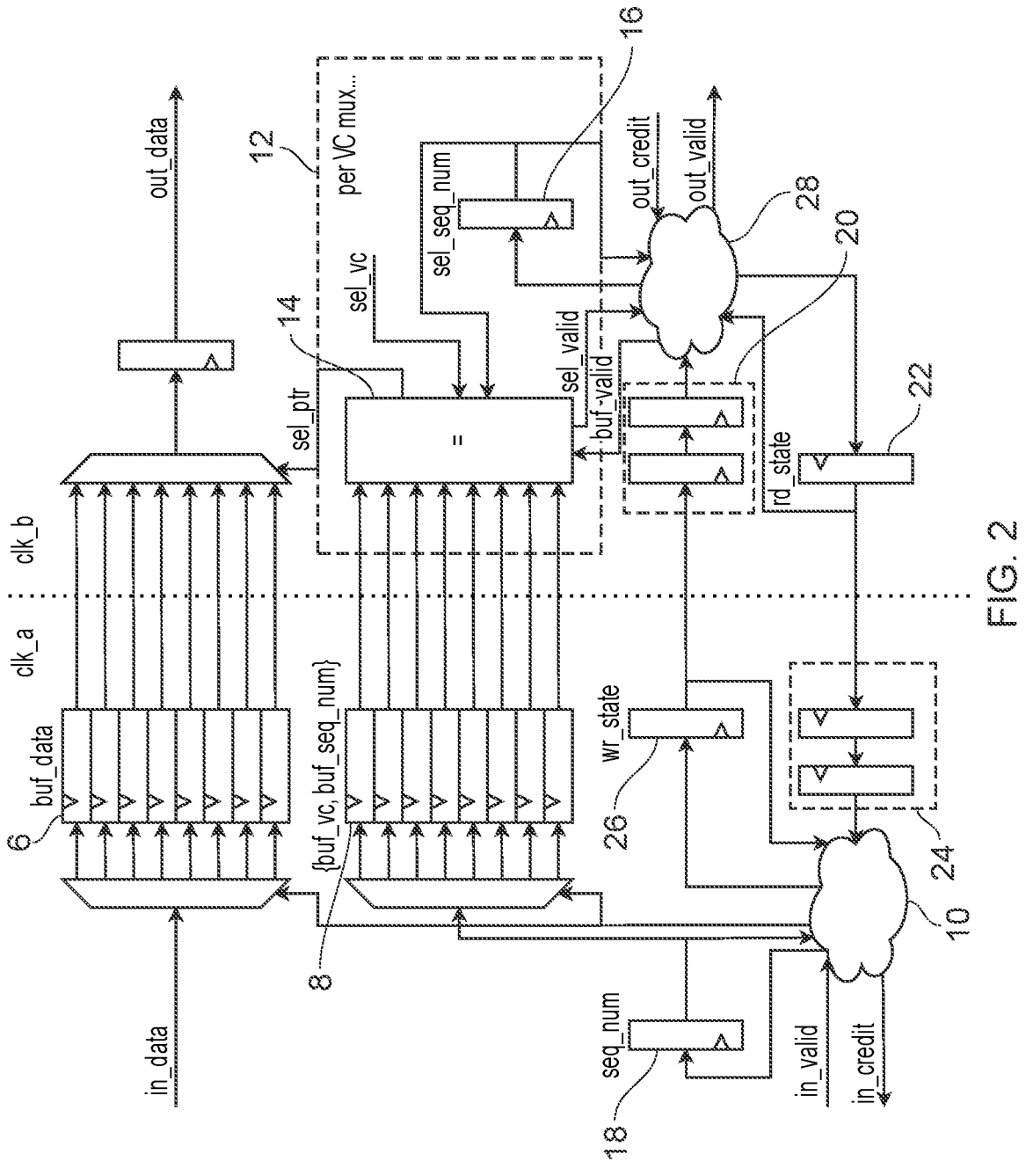
FIG. 2 illustrates in greater detail the apparatus for transmitting data across the clock boundary.

FIG. 2 provides a more detailed schematic view of the clock domain crossing circuitry shown in FIG. 1. Elements numbered the same way are the same as in FIG. 1. FIG. 2 shows a clock boundary as a vertical dashed line. On the left side of the boundary each element (flip flops etc.) is controlled by a first clock signal (clk_a), and on the right side of the boundary each element is controlled by a second clock signal (clk_b). The two clock signals may be independent from each other.

FIG. 2 shows that the selection circuitry 12 may comprise a comparator 14. Each comparator 14 checks the indicator entries to identify which data entries store data belonging to a particular data channel indicated by the input "sel_vc". One or more comparators may be provided with a varying input sel_vc, or a comparator may be provided for each data channel each having a fixed input sel_vc. Each comparator takes as an input current values of the indicator entries and determines which entries store a channel indication which matches the input channel, hence identifying which entries of the data buffer store data corresponding to sel_vc. The selection may be controlled by a vector buf_valid which indicates which data buffer entries are valid, such that the comparator does not select an invalid entry.

There may be more than one data entry belonging to a particular data channel in the buffer circuitry at a given time. The selection circuitry 12 may wish to select the earliest data entry to maintain channel ordering. The selection circuitry 12 may also wish to select a particular next data block at the next position in the sequence. It may not be guaranteed that the earliest data entry at a given time is the next position in the sequence, because the entries may appear on the consumer side out of order due to different delays encountered when crossing the clock boundary. Therefore, in addition to selecting a particular data channel, each instance of selection circuitry 12 may also select an entry having a particular sequence position.

The particular desired sequence position may be stored in consumer-side sequence counting circuitry 16. The sequence counting circuitry 16 stores a counter for each data channel and increments the counter each time data is read from that data channel. The counter in the sequence counting circuitry 16 may mirror a counter stored in producer-side sequence counting circuitry 18, such that both counters read the same value after being incremented the same number of times (e.g., both counters may wrap around at the same value). The producer-side counter for a given data channel is incremented each time a data block belonging to that data channel is written to the data buffer 6, and the value from the producer-side counter 18 is stored in the corresponding indicator entry.

For example, at the start of processing both counters may read the same value "0". A first data block may be received and the allocation circuitry 10 may reference associated indicator entry and store to the indicator entry associated with the data entry to which that data block was stored an indication that the data block has sequence position 0. The producer-side counter 18 increments to 1 after storing the first data block to the buffer and then stores the next data block with the sequence position 1, and so on. The selection circuitry may initially select for providing to the consumer circuitry the data block having the counter value "0" stored in the associated indicator entry, and afterwards update its counter to indicate that the next block it is looking for has a sequence position 1. In this way, the two counters 16 and 18 stay in step with each other and allow a sequence order to be maintained.

The counters 16 and 18 can be permitted to wrap around, but should do so at the same point because the producer-side counter sets the value which the selection circuitry is looking for on the basis of the consumer-side counter 16. In addition, the size of each counter 16, 18 should be sufficient that at a given time the data buffer cannot store two data blocks from the same data channel having the same sequence value. Therefore, each counter should have at least as many states as the number of data entries available to a particular data channel (e.g., D+S in examples discussed above).

Therefore, the comparison performed by the comparator 14 may also take as an input the desired next sequence position "sel_seq_num" stored in the consumer-side sequence counting circuitry 16. Hence, the selection circuitry 12 is essentially performing a lookup to determine whether any of the indicator entries indicate that their associated data entry stores a data block in the next sequence position for a particular data channel. This is a lookup using a particular combination of data channel and sequence position, and is shown in greater detail in FIG. 6.

The selection circuitry outputs a pointer identifying which, if any, data entry matches the particular input combination of data channel (sel_vc) and sequence number (sel_seq_num) used for that particular lookup, and which is therefore a candidate to be provided to the consumer circuitry. As mentioned, the lookup may be performed in parallel for each data channel and therefore even though a candidate data entry may be identified for selection, this does not mean that that data entry is actually output (if another entry from a different data channel is selected instead). If the candidate entry for a particular data channel is provided to the consumer as out_data then the consumer-side counter 16 corresponding to that data channel is incremented. In addition to outputting a selection pointer "sel_ptr", the selection circuitry 12 also outputs the vector sel_valid providing an indication to control circuitry 28 of which, if any, entries of the data buffer were selected by the selection circuitry 12.

FIG. 2 also illustrates the transfer of validity information between control circuitry 10 on the consumer side of the clock boundary and control circuitry 28 on the producer side of the clock boundary. The validity information is provided for each data entry and indicates whether that data entry stores valid data which has not been read. On the producer side, the validity information can be used to determine which entries are available for storing data received from the producer circuitry, and therefore can be used to control circuitry for selecting which entry incoming data ("in_data") should be stored to (e.g., by controlling a multiplexer as shown in FIG. 2). On the consumer side, the validity information can be used to determine which entries store data which could be provided to the consumer circuitry, and is used to form the vector buf_valid used for filtering the selection circuitry 12.

The validity information for each data entry is formed of two bits. One bit is maintained by the producer side and one bit is maintained by the consumer side.

The producer side maintains a bit per data entry, "wr_state" in storage element 26. The write state bit is updated for a given entry each time that entry is written to, to be written to and cannot be read from. Hence, the meaning of the state wr_state [n]=0, rd_state [n]=0 is the same as the state wr_state [n]=1, rd_state [n]=1.

At step 310, data is written to entry [n] and wr_state is updated from 1 to 0. Therefore, at step 312, wr_state [n]=0 and rd_state [n]=1 indicating that the entry is occupied with valid data and can be read from, but cannot be written to.

At step 314 data is read from entry [n]. rd_state is updated from 1 to 0 and the state is the same as at 300.

Therefore the validity of an entry is indicated by wr_state and rd_state as follows:

| wr_state[n] | rd_state[n] | Description | rd_state[n] $\oplus$ wr_state[n] |
|---|---|---|---|
| 0 | 0 | Entry is free. Entry cannot be read. Entry can be written. | 0 |
| 1 | 0 | Entry is occupied. Entry can be read. Entry cannot be written. | 1 |
| 1 | 1 | Entry is free. Entry cannot be read. Entry can be written. | 0 |
| 0 | 1 | Entry is occupied. Entry can be read. Entry cannot be written. | 1 | where updating the bit involves changing its state (e.g., if wr_state was previously 0, then it is updated to 1, and vice versa). Similarly the consumer side maintains a read state bit "rd_state" per data entry in storage element 22, the read state bit being updated each time the corresponding data entry is read. Hence, each side updates its own bit and transmits that bit to the other side so that both sides have access to the wr_state and rd_state bits for each data entry.

Dual flip-flop synchronizers 20 and 24 are provided to allow the wr_state and rd_state signals to be transmitted across the clock boundary. The dual flip-flop synchronizers reduce the likelihood of metastability in the signal communicated over the clock boundary. A transmitted signal is captured by the first of the two flip-flops under control of a different clock to the transmitted signal, meaning that the signal could be sampled in a metastable state. The signal is then captured by the second flip-flop after the output of the first flip flop has had the opportunity to settle to a stable logic level, to reduce the likelihood of metastability propagating in the receiver clock domain. By transmitting write state and read state over the clock domain, both sides have a view of both bits. Because two bits are provided, each side never needs to update a received bit.

Figure 3:
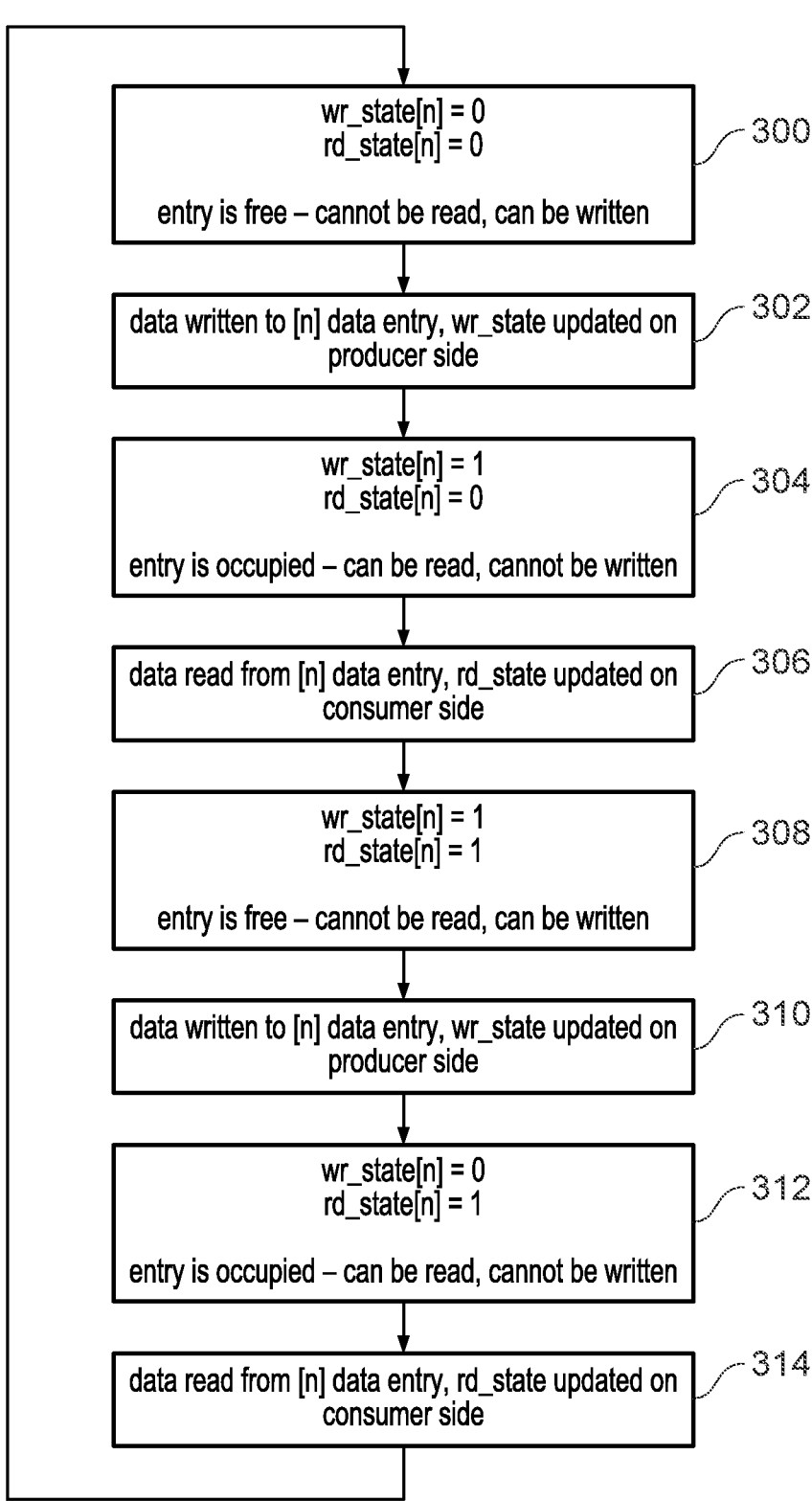
FIG. 3 illustrates a sequence of valid state transitions when accessing data entries in buffer circuitry.

FIG. 3 illustrates the possible states which could be taken by the wr_state and rd_state for a particular data entry at the position [n] in the data buffer 6. At step 300 both wr_state [n] and rd_state [n] are zero. This indicated that the entry is free, as it does not store valid data, and that it cannot be read from but can be written to.

At step 302 data is written to entry [n], and control circuitry 10 on the producer side updates wr_state [n] to reflect the update. Therefore, at step 304 wr_state [n]=1 and rd_state [n]=0, indicating that the entry [n] is occupied with valid data and that it can be read from, but cannot be written to.

At step 306 data is read from entry [n], and control circuitry 28 on the consumer side updates rd_state [n]. Therefore, at step 308, wr_state [n]=1 and rd_state [n]=1. In this state, the entry is once again free because the data has been read from entry [n], meaning that entry [n] is available It will be seen that whether or not an entry contains valid data can be determined by performing a XOR operation on wr_state and rd_state. Therefore, the control circuitry 28 on the consumer side can determine the valid vector "buf_valid" by calculating a XOR of the two valid state bits for each data entry.

FIG. 2 also illustrates credits being transmitted to and from the producer circuitry and the consumer circuitry (in_credit, out_credit). Credits indicate to the respective circuitry how many entries of the data buffer are available for data blocks of each data channel. As described earlier, credits may be formed of two parts, dedicated credits and shared credits, where dedicated credits can only be used for a particular data channel and shared credits can be used for any data channel. For example, if there were D=2 dedicated credits per channel and S=5 shared credits, then for a system with M=2 data channels there may be a total number of entries T=(D*M)+S=(2*2)+5=9 entries. When no slots are occupied, each channel may have D+S=7 credits available. Use of shared credits by a particular data channel reduces the number of credits available for any data channel, but use of dedicated credits does not affect other data channels. Even if one channel uses all of its available credits, including the shared credits, then there are at least D credits available to each other channel, meaning that each channel can use at least D data entries of the buffer circuitry at any point, regardless of the activity of the other data channels. This means that each data channel can maintain independent forward progress, and be able to have some data in flight at any point in time.

As mentioned above, the buffer circuitry may comprise T=(M*D)+N−D data entries such that any given data channel may access at least N data entries (although, depending on the utilization of the entries by other data channels the full N entries may not always be available). N is selected such that the buffer enables full throughput to be maintained over the clock domain crossing, meaning that data is transferred at the maximum rate possible given the first and second clock speeds without being slowed down by the buffer. That may be, for example, one data block per cycle of the slower clock. The rate of data transfer through the buffer may depend on various factors including the design of the buffer, but in any case has a dependence on the frequency and phase of the first and second clock signals. The number N may be selected such that full throughput can be maintained even in the worst case relationship between the first and second clock signals.

The worst case timing situation may arise, for example, when both clocks have the same frequency but are 180 degrees out of phase. In such a case, the steps for transferring a data block via one data entry may be as follows:

1. Data is written in to the data entry. The wr_state signal is updated in storage element 26 on the clock 1 side.
2. wr_state signal is captured by the first flip-flop of the synchronizer 20 on clock 2 side. Since the clocks are completely out of phase, this capture can happen as late as 1.5 clock cycles later than the signal was asserted.
3. The second flip-flop of the synchronizer 20 captures the state of the first flip-flop 1 cycle later. At this point the total time is 2.5 cycles.
4. The consumer side control circuitry 28 observes the updated wr_state and causes data to be read from the corresponding data buffer entry. In the ideal situation this takes 1 cycle, for a total of 3.5 cycles.
5. The consumer side control circuitry 28 updates the rd_state in storage element 22. This occurs 1 cycle after the data is validly read for a total of 4.5 cycles.
6. The rd_state signal is captured by the first flip-flop in synchronizer 24. Since the clocks are completely out of phase, this capture can happen as late as 1.5 clock cycles later than the signal was asserted. The total time at this stage is 6 clock cycles.
7. The second flip-flop of the synchronizer 24 captures the state of the first flip-flop 1 cycle later, for a total time of 7 cycles.
8. Control circuitry 10 observes the updated rd_state and enables the corresponding data buffer entry to be overwritten with a new data block. This takes a further cycle, for a total time of 8 cycles (of the first clock signal).

Therefore, in the example shown above the process takes 8 clock cycles. Each step can be pipelined, such that each step happens every processing cycle for a different data entry, meaning that data can be transferred (step 4) every processing cycle. However, this requires sufficient entries that at least one entry is at step 4 each processing cycle. This requires there to be at least as many entries as the number of processing cycles required for each entry. Hence, in this example there may be a minimum of N=8 data entries required for full throughput.

It will be appreciated that the above is merely an example, and additional cycles may be required (such as to transfer credits), meaning that more data entries may be required for full throughput.

If the first and second clocks were in phase, then steps 2 and 6 would have taken 1 cycle rather than 1.5, meaning that the total round trip time would be only 7 cycles. Note that the exact time taken for steps 2 and 6 may depend on the length of the wires in a particular implementation, and the above example assumes that the sampling time is 1 cycle and a further 0.5 cycles are added when the phase is too far off due to missing the sampling window.

If the first and second clocks had different clock frequencies, then from the perspective of the slower clock the total number of cycles would be reduced. In the example above, if clock 1 were the slowest clock and clock 2 could perform steps 2-5 in 2 cycles of clock 1, then the round trip time would be 5 (clock 1) cycles instead of 8. That means only 5 entries would be needed to avoid having cycles (from the slowest clock, clock 1 perspective) where no data is transferred.

Hence, in some examples the worst case timing scenario is when clocks 1 and 2 have the same clock frequency and are 180 degrees out of phase.

Figure 4:
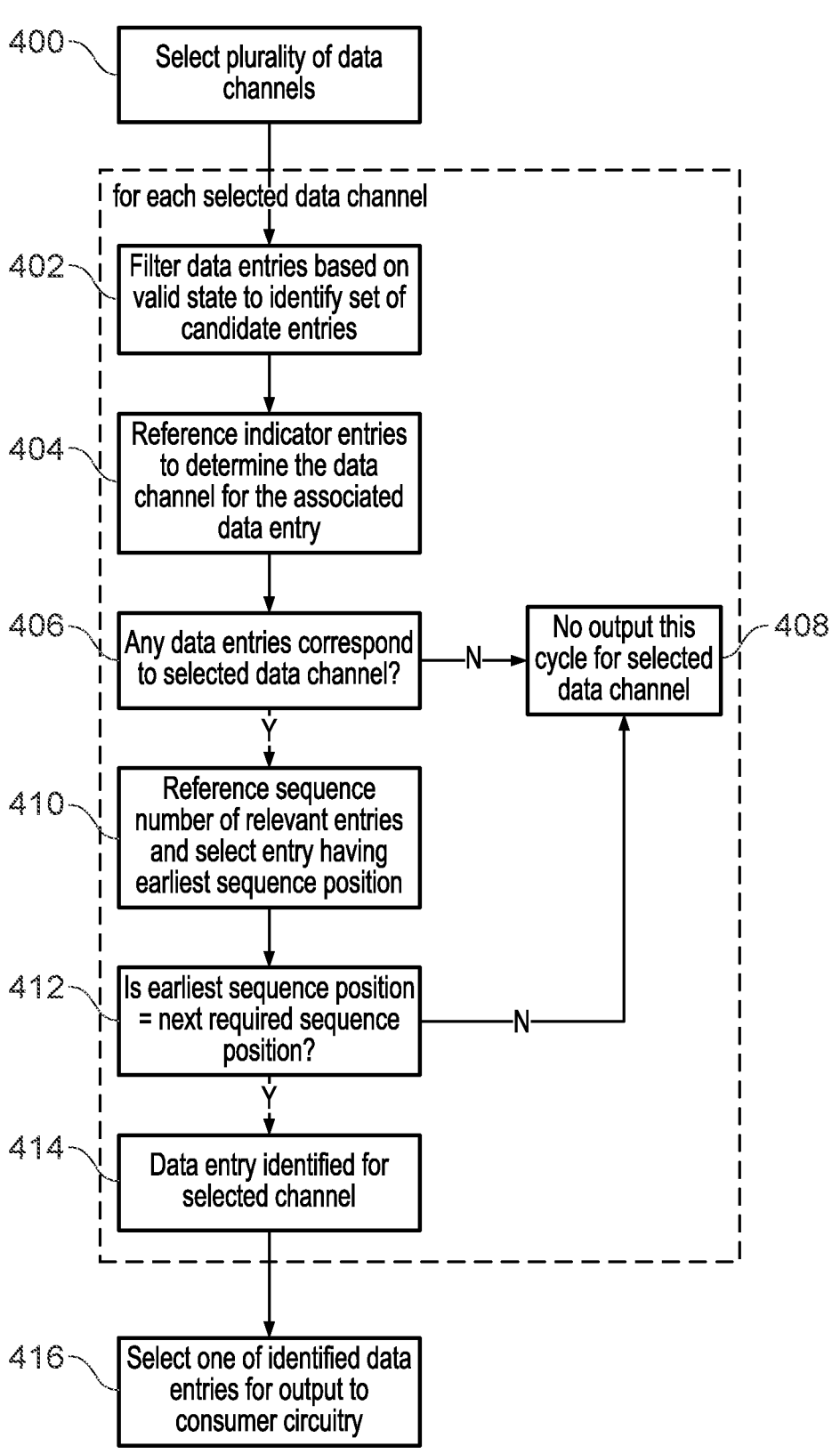

FIGS. 4 and 5 are flow diagrams illustrating an example process of selecting a data entry for providing to the consumer circuitry, which may be triggered by a selection event. FIG. 4 illustrates a process whereby data entries are selected for multiple data channels in parallel using several instances of selection circuitry 12, whilst FIG. 5 illustrates a non-parallel selection which could be performed with a single instance of selection circuitry 12.

The process of FIG. 4 starts at step 400 in which a plurality of data channels are selected. The data channels are those for which a data block may be selected for output to the consumer circuitry. In some examples, all data channels may be selected, although in other examples a plurality of data channels may be actively selected as candidate data channels. Each selected data channel is provided as an input sel_vc to an instance of selection circuitry 12.

Steps 402-414 may be performed in parallel. At step 402 the data entries in the buffer 6 are filtered based on the valid state vector buf_valid to identify a set of candidate data entries. At step 404 the comparator 14 determines whether any of the indicator entries corresponding to valid data entries are associated with the selected data channel.

If there are any matches for the selected data channel, then at steps 410 and 412 the sequence number of the matching entries may be checked to determine whether any entries have a sequence number matching the next required sequence position (indicated by counter 16). Although shown as a linear process, in practice the sequence number comparison may be carried out in the same step as the data channel comparison (see FIG. 6). If there are no entries which match the desired combination of data channel and sequence number then there are no suitable data entries for which data can be output for the selected data channel in that cycle, and the process terminates at step 408.

If, however, the indicator entries identify that there is a data entry for the selected data channel which has the next sequence number for that data channel, then at step 414 said data entry is identified (via output vector sel_valid) as a potential data entry for output.

At step 416, consumer side control circuitry 28 selects one of the data entries identified by the selection circuitry to be output to the consumer circuitry. When there are multiple identified data entries from different data channels which are each suitable for output to the consumer circuitry, then a data channel may be selected in various ways. For example, a data channel could be selected at random, or could be selected based on bandwidth usage by the data channels to provide, over a given period, an equal share of bandwidth between the data channels or so that bandwidth is provided to different data channels in some predetermined distribution.

FIG. 5 illustrates a similar process to FIG. 4, but performed by one instance of selection circuitry. At step 500 a first data channel is selected. Steps 402-414 are carried out as described above to determine whether the data circuitry comprises a data entry belonging to the selected data channel which is suitable for output (has the required sequence position). If an entry is identified then that entry may be output to the consumer at step 506. Alternatively, a further data channel could be selected at steps 502 and 504 and the process of steps 402-414 repeated. If, once all of a set of data channels have been selected, there are multiple identified data entries then at step 506 a selection may be made between these entries in a similar manner to step 416.

Figure 6:
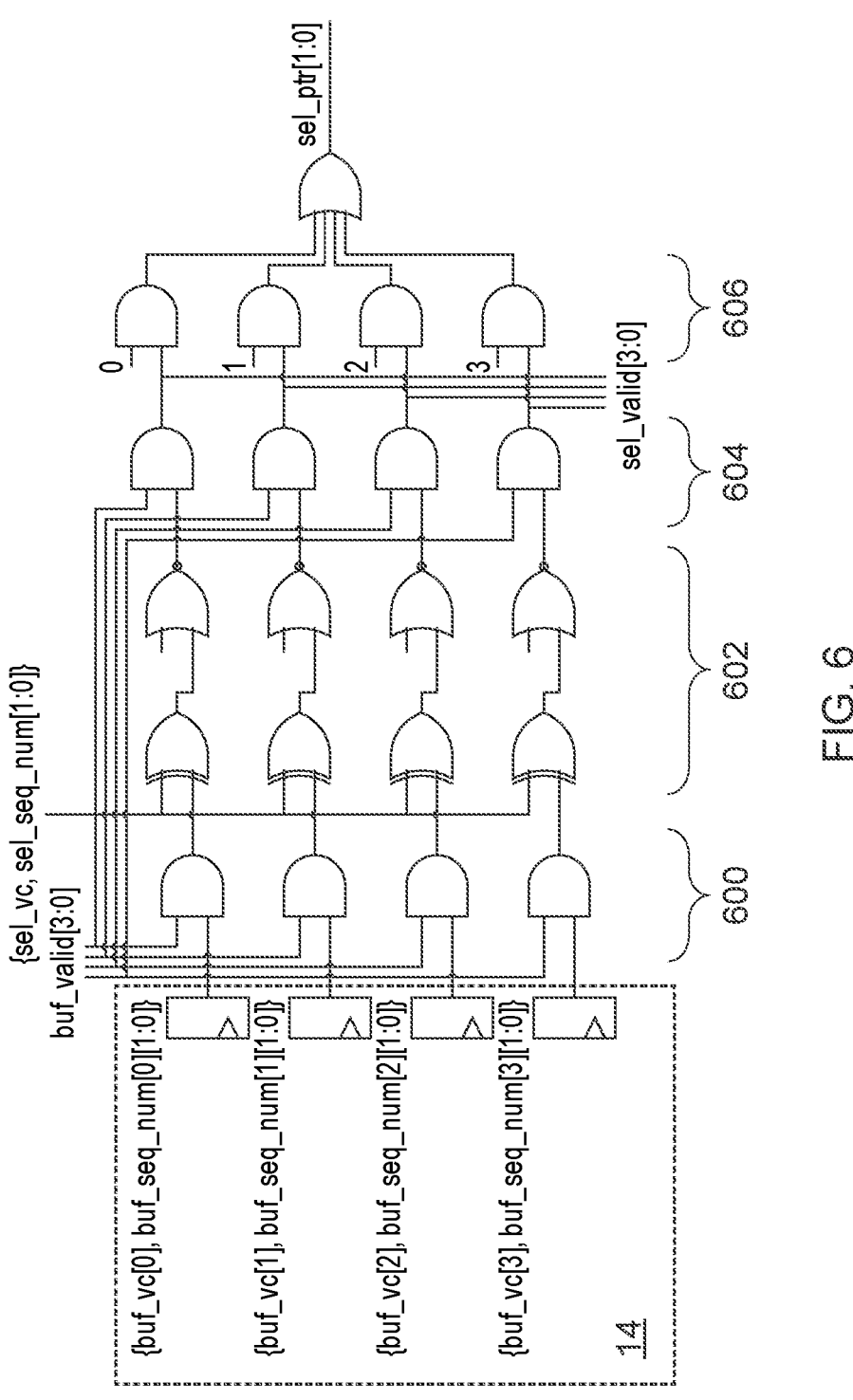
FIG. 6 schematically illustrates an implementation of selection circuitry.

FIG. 6 illustrates an example implementation of comparator circuitry 14 as shown in FIG. 2. The circuitry takes as inputs the values of the indicator entries 14 (4 entries are shown in FIG. 6 for clarity, although it will be appreciated that the number of indicator entries input may be the same as the number of indicator entries in the indicator storage), the buf_valid vector, the sel_vc data channel selection, and the sel_seq_num next sequence number for that data channel. FIG. 6 illustrates sequence number using a 2-bit counter [1:0], but it will be appreciated that when more than 4 indicator entries are provided then a greater size counter may be required such that each entry for a given data channel can have a unique sequence number.

An initial step of filtering is carried out by a set of AND gates 600, one provided per indicator entry, based on the validity indication for the data buffer entry corresponding to that indicator entry. The validity filtering may be carried out at the start of the comparison for timing reasons, so that changing validity state during the selection process cannot lead to an incorrect entry being selected.

A set of XOR and NOR gates 602 may then be used to determine whether any of the input indicator entries 14 indicate a combination of buf_vc and buf_seq_num which matches the desired combination of sel_vc and sel_seq_num. The output from the stage 602 is filtered again by the buf_valid state with a second set of AND gates 604 to filter out false matches.

The output from stage 604 is a vector sel_valid indicating whether any of the indicator entries 14 matches the desired data channel and sequence position. This input may be provided to consumer side control circuitry 28, e.g. for selecting a data channel. The input is also provided to a set of AND gates 606 which each take as a second input a pointer to a particular data entry of the data buffer. The output from stage 606 is a pointer which identifies the data entry of the buffer circuitry, if any, which satisfies the desired data channel and sequence conditions, and which may be used to select an entry of the buffer circuitry 6 to control output of a data block to the consumer circuitry ("out_data").

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
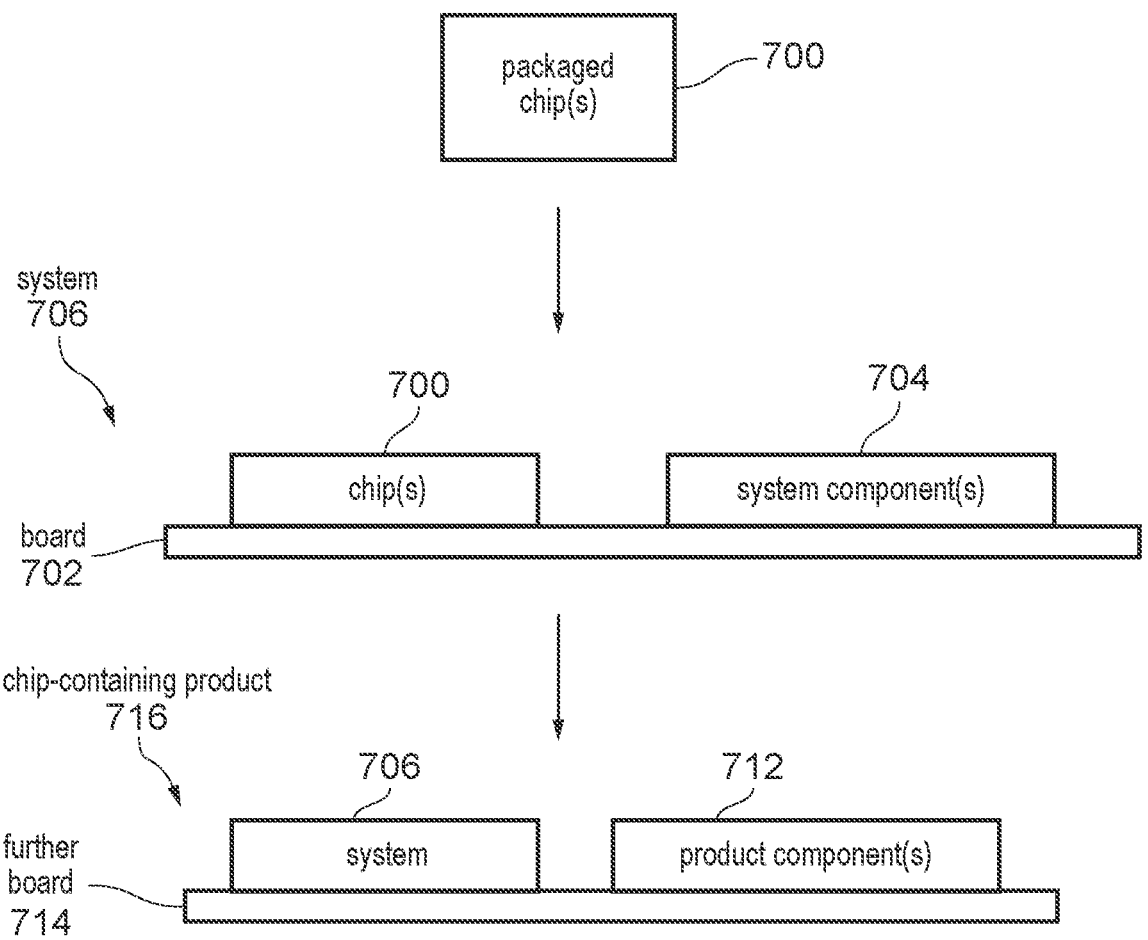
FIG. 7 illustrates a system and a chip-containing product.

As shown in FIG. 7, one or more packaged chips 700, with the apparatus described above implemented on one chip or distributed over two or more of the chips, are manufactured by a semiconductor chip manufacturer. In some examples, the chip product 700 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 700 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. modular chips combined to provide the functionality of a single chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 700 are assembled on a board 702 together with at least one system component 704 to provide a system 706. For example, the board may comprise a printed circuit board. The board substrate may be made of any of a variety of materials, e.g. plastic, glass, ceramic, or a flexible substrate material such as paper, plastic or textile material. The at least one system component 704 comprise one or more external components which are not part of the one or more packaged chip(s) 700. For example, the at least one system component 704 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 716 is manufactured comprising the system 706 (including the board 702, the one or more chips 700 and the at least one system component 704) and one or more product components 712. The product components 712 comprise one or more further components which are not part of the system 706. As a non-exhaustive list of examples, the one or more product components 712 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 706 and one or more product components 712 may be assembled on to a further board 714.

The board 702 or the further board 714 may be provided on or within a device housing or other structural support (e.g. a frame or blade) to provide a product which can be handled by a user and/or is intended for operational use by a person or company.

The system 706 or the chip-containing product 716 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/ or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus, comprising:
  buffer circuitry comprising a plurality of data entries, wherein each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;
  indicator storage comprising a plurality of indicator entries, wherein each data entry has an associated indicator entry and, for a given data entry storing a given data block, the associated indicator entry is configured to indicate the associated data channel for the given data block; and
  selection circuitry configured, responsive to a selection event, to select a data entry from which to provide a data block to the consumer circuitry, wherein the selection circuitry is configured to reference the plurality of indicator entries to determine the associated data channel for each of a number of candidate data entries for selection.

(2) The apparatus according to clause 1, comprising allocation circuitry responsive to a received data block from the producer circuitry, to:
  choose a free data entry available for storage of data blocks having the associated data channel for the received data block,
  store the received data block in the chosen data entry, and
  populate the indicator entry associated with the chosen data entry.

(3) The apparatus according to any of clauses 1 and 2, wherein the plurality of data entries comprise shared data entries available for storage of data blocks whose associated data channel is any one of two or more data channels.

(4) The apparatus according to clause 3, wherein, for at least one given data channel the buffer circuitry comprises at least one dedicated data entry available for storage of data blocks for that given data channel.

(5) The apparatus according to any preceding clause, wherein for the given data entry storing the given data block, the associated indicator entry is configured to indicate a sequence position of the given data block within the associated data channel.

(6) The apparatus according to clause 5, comprising sequence counting circuitry configured to maintain, for each of the plurality of data channels, an indication of a sequence position of a latest data block received from the producer circuitry for that data channel, for reference by allocation circuitry when populating the associated indicator entry for the given data entry.

(7) The apparatus according to any preceding clause, wherein a number of data entries provided by the buffer circuitry is equal to or greater than a number of data channels from which data can be received.

(8) The apparatus according to clause 7, comprising capacity indication circuitry to provide capacity information to the producer circuitry;
  wherein for each data channel the capacity information indicates a remaining number of data entries available for storage of data blocks for that data channel, wherein the remaining number is calculated based on a total number of data entries available for storage of data blocks for that data channel and a number of data entries currently occupied by data blocks for that channel; and for each data channel, the total number of data entries is at least one.

(9) The apparatus according to any preceding clause, wherein the buffer circuitry comprises at least N data entries, wherein N is a minimum number of data entries required to maintain full throughput of data blocks communicated from the producer circuitry to the consumer circuitry in a worst case timing scenario having regard to a relation between the first clock signal and the second clock signal.

(10) The apparatus according to clause 9, wherein the buffer circuitry comprises at least N–D data entries, plus D data entries per data channel, where D is a positive integer representing a minimum number of data entries available for each data channel.

(11) The apparatus according to any preceding clause wherein, in response to the selection event, the selection circuitry is configured to determine in parallel, for multiple data channels of the plurality of data channels, which of the candidate data entries store data blocks associated with that data channel; and in response to determining that the candidate data entries comprise data blocks associated with more than one data channel, the selection circuitry is configured to apply a selection criterion to select one of the data channels for providing the data block to the consumer circuitry.

(12) The apparatus according to any preceding clause, wherein, in response to the selection event, the selection circuitry is configured to determine for a particular data channel which of the candidate data entries store data blocks associated with the particular data channel.

(13) The apparatus according to any preceding clause, comprising valid state circuitry configured to maintain valid state for a corresponding data entry, the valid state indicating whether the corresponding data entry stores a data block that is available to be read by the consumer circuitry.

(14) The apparatus according to clause 13, wherein the selection circuitry is configured to reference the valid state circuitry in advance of referencing the plurality of indicator entries when selecting a data entry.

(15) The apparatus according to any of clauses 13 and 14, comprising producer-side update circuitry configured to update the valid state for a given data entry in response to determining that allocation circuitry has stored a data block in the given data entry.

(16) The apparatus according to any of clauses 13 to 15, comprising consumer-side update circuitry configured to update the valid state for a given data entry in response to determining that the selection circuitry has selected the given data entry for providing a data block to the consumer circuitry.

(17) A system comprising:

the apparatus of any preceding clause, implemented in at least one packaged chip;

at least one system component; and a board, wherein the at least one packaged chip and the at least one system component are assembled on the board.

(18) A chip-containing product comprising the system of clause 17 assembled on a further board with at least one other product component.

(19) A non-transitory computer-readable medium to store computer-readable code for fabrication of an apparatus, comprising:

buffer circuitry comprising a plurality of data entries, wherein each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;

indicator storage comprising a plurality of indicator entries, wherein each data entry has an associated indicator entry and, for a given data entry storing a given data block, the associated indicator entry is configured to indicate the associated data channel for the given data block; and selection circuitry configured, responsive to a selection event, to select a data entry from which to provide a data block to the consumer circuitry, wherein the selection circuitry is configured to reference the plurality of indicator entries to determine the associated data channel for each of a number of candidate data entries for selection.

(20) A method, comprising:

storing a given data block in a given entry of buffer circuitry, wherein the buffer circuitry comprises a plurality of data entries, each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;

providing indicator storage comprising a plurality of indicator entries, wherein each data entry has an associated indicator entry and, for the given data entry storing the given data block, indicating the associated data channel for the given data block with the associated indicator entry; and in response to a selection event, selecting, with selection circuitry, a data entry from which to provide a data block to the consumer circuitry, wherein the selection circuitry is configured to reference the plurality of indicator entries to determine the associated data channel for each of a number of candidate data entries for selection.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:
buffer circuitry comprising a plurality of data entries, wherein each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;
indicator storage comprising a plurality of indicator entries, wherein each data entry has an associated indicator entry and, for a given data entry storing a given data block, the associated indicator entry is configured to indicate the associated data channel for the given data block; and
selection circuitry configured, responsive to a selection event, to select a data entry from which to provide a data block to the consumer circuitry, wherein the selection circuitry is configured to reference the plurality of indicator entries to determine the associated data channel for each of a number of candidate data entries for selection.

2. The apparatus according to claim 1, comprising allocation circuitry responsive to a received data block from the producer circuitry, to:
choose a free data entry available for storage of a data blocks having the associated data channel for the received data block,
store the received data block in the chosen data entry, and
populate the indicator entry associated with the chosen data entry.

3. The apparatus according to claim 1, wherein the plurality of data entries comprise shared data entries available for storage of data blocks whose associated data channel is any one of two or more data channels.

4. The apparatus according to claim 3, wherein, for at least one given data channel the buffer circuitry comprises at least one dedicated data entry available for storage of data blocks for that given data channel.

5. The apparatus according to claim 1, wherein for the given data entry storing the given data block, the associated indicator entry is configured to indicate a sequence position of the given data block within the associated data channel.

6. The apparatus according to claim 5, comprising sequence counting circuitry configured to maintain, for each of the plurality of data channels, an indication of a sequence position of a latest data block received from the producer circuitry for that data channel, for reference by allocation circuitry when populating the associated indicator entry for the given data entry.

7. The apparatus according to claim 1, wherein a number of data entries provided by the buffer circuitry is equal to or greater than a number of data channels from which data can be received.

8. The apparatus according to claim 7, comprising capacity indication circuitry to provide capacity information to the producer circuitry;
wherein for each data channel the capacity information indicates a remaining number of data entries available for storage of data blocks for that data channel, wherein the remaining number is calculated based on a total number of data entries available for storage of data blocks for that data channel and a number of data entries currently occupied by data blocks for that channel; and
for each data channel, the total number of data entries is at least one.

9. The apparatus according to claim 1, wherein the buffer circuitry comprises at least N data entries, wherein N is a minimum number of data entries required to maintain full throughput of data blocks communicated from the producer circuitry to the consumer circuitry in a worst case timing scenario having regard to a relation between the first clock signal and the second clock signal.

10. The apparatus according to claim 9, wherein the buffer circuitry comprises at least N–D data entries, plus D data entries per data channel, where D is a positive integer representing a minimum number of data entries available for each data channel.

11. The apparatus according to claim 1 wherein, in response to the selection event, the selection circuitry is configured to determine in parallel, for multiple data channels of the plurality of data channels, which of the candidate data entries store data blocks associated with that data channel; and
in response to determining that the candidate data entries comprise data blocks associated with more than one data channel, the selection circuitry is configured to apply a selection criterion to select one of the data channels for providing the data block to the consumer circuitry.

12. The apparatus according to claim 1, wherein, in response to the selection event, the selection circuitry is configured to determine for a particular data channel which of the candidate data entries store data blocks associated with the particular data channel.

13. The apparatus according to claim 1, comprising valid state circuitry configured to maintain valid state for a corresponding data entry, the valid state indicating whether the corresponding data entry stores a data block that is available to be read by the consumer circuitry.

14. The apparatus according to claim 13, wherein the selection circuitry is configured to reference the valid state circuitry in advance of referencing the plurality of indicator entries when selecting a data entry.

15. The apparatus according to claim 13, comprising producer-side update circuitry configured to update the valid state for a given data entry in response to determining that allocation circuitry has stored a data block in the given data entry.

16. The apparatus according to claim 13, comprising consumer-side update circuitry configured to update the valid state for a given data entry in response to determining that the selection circuitry has selected the given data entry for providing a data block to the consumer circuitry.

17. A system comprising:
the apparatus of claim 1, implemented in at least one packaged chip;
at least one system component; and
a board, wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of an apparatus, comprising:

buffer circuitry comprising a plurality of data entries, wherein each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;

indicator storage comprising a plurality of indicator entries, wherein each data entry has an associated indicator entry and, for a given data entry storing a given data block, the associated indicator entry is configured to indicate the associated data channel for the given data block; and selection circuitry configured, responsive to a selection event, to select a data entry from which to provide a data block to the consumer circuitry, wherein the selection circuitry is configured to reference the plurality of indicator entries to determine the associated data channel for each of a number of candidate data entries for selection.

20. A method, comprising:

storing a given data block in a given data entry of buffer circuitry, wherein the buffer circuitry comprises a plurality of data entries, each data entry is arranged to store a data block, each data block has an associated data channel from amongst a plurality of data channels, and the buffer circuitry is configured to receive data blocks from producer circuitry controlled by a first clock signal and to provide the data blocks to consumer circuitry controlled by a second clock signal;

providing indicator storage comprising a plurality of indicator entries, wherein each data entry has an associated indicator entry and, for the given data entry storing the given data block, indicating the associated data channel for the given data block with the associated indicator entry; and in response to a selection event, selecting, with selection circuitry, a data entry from which to provide a data block to the consumer circuitry, wherein the selection circuitry is configured to reference the plurality of indicator entries to determine the associated data channel for each of a number of candidate data entries for selection.

\* \* \* \* \*